Oct. 18, 1932.                J. GASTERSTÄDT                1,883,685
                              HYDRAULIC CLUTCH
                            Filed June 18, 1928
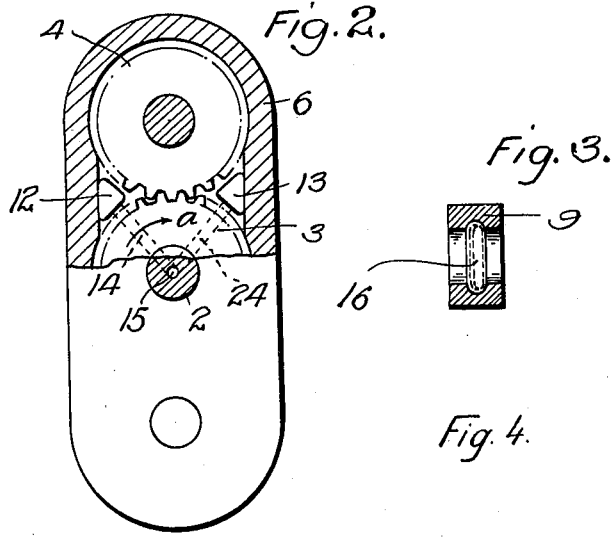
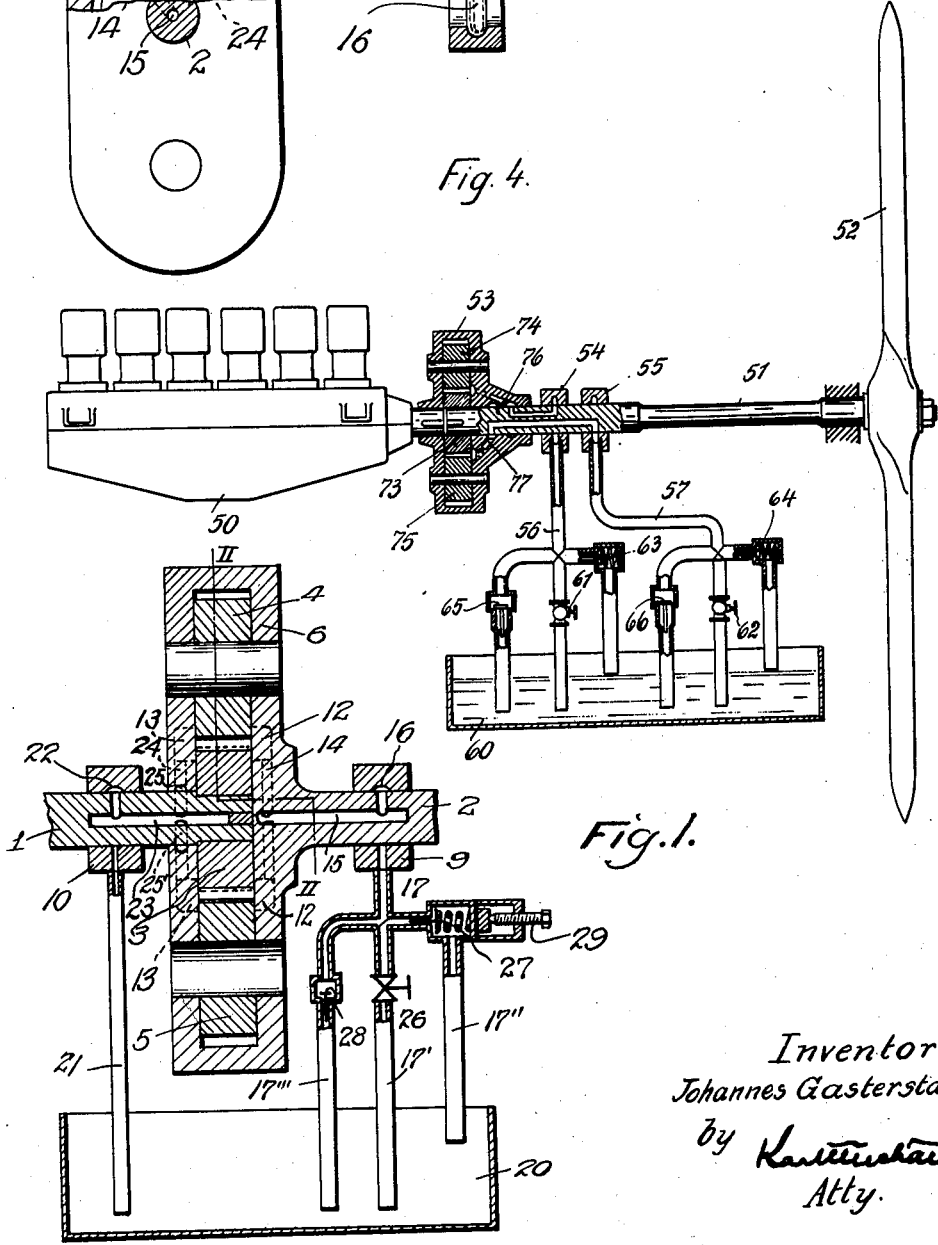
Inventor:
Johannes Gasterstädt
by
Atty.

Patented Oct. 18, 1932

1,883,685

UNITED STATES PATENT OFFICE

JOHANNES GASTERSTÄDT, OF DESSAU, GERMANY, ASSIGNOR TO HUGO JUNKERS, OF DESSAU, GERMANY

HYDRAULIC CLUTCH

Application filed June 18, 1928, Serial No. 286,205, and in Germany June 20, 1927.

The present invention relates to hydraulic clutches of the kind which transmits the turning-moment of a driving part to a driven part by means of the static pressure of a liquid.

In hydraulic clutches as hitherto designed the members serving for the transmission of pressure have been formed after the manner of the parts of a rotary pump, one member of which is connected with one, another member with the other revolving part. In such a case the supply and exhaust spaces of the pump are connected with each other as a rule by conduits, in which may be inserted a reservoir for the coupling liquid.

In these conduits are further inserted automatically active (for instance of the character of safety-valves) or manually adjustable controlling means such as overload valves. If such a valve is open, the pump does not encounter any resistance and the clutch does not transmit any turning moment, the part to be driven remaining stationary. If the valve is closed altogether, the clutch acts like a rigid coupling. In intermediate positions of the valve the part to be driven is carried along, however with a certain slip relative to the driving part.

In clutches of the kind described a freewheel action can be obtained, whereby the driven part is carried along only in one direction of rotation of the driving part, but not in the other, or the normally driven part is free to rotate at higher speed than the driving one, however without now exerting any force thereon.

According to the present invention clutches of the kind described are improved by providing means for securing a passage of liquid through the pump also in the case of freewheel action, or if the driving part starts rotating in opposite direction, the clutch pump then operating in the opposite direction, whereby dry running and consequent increased wear of the pump is avoided.

A suitable means for attaining this end consists in the provision of branch conduits formed in the conduit connecting the pump spaces, in one branch being inserted the overload valve or other control member, while in the other is mounted a non-return valve in such manner, that it will remain closed as long as the clutch operates in the normal direction of rotation and transmission of the turning moment, while opening whenever the driving part of the clutch reverses its direction of rotation or whenever free-wheel action takes place, i. e. when the fluid current generated by the rotary pump is reversed.

The regulating members of the clutch pump and also the non-return valves may be arranged in a well known manner, so as not to revolve with the clutch, but to remain stationary, being connected with the revolving parts of the clutch partly by stationary and partly by revolving conduits.

In the drawing affixed to this specification and forming part thereof several clutches embodying my invention are illustrated diagrammatically by way of example.

In the drawing,

Fig. 1 is an axial section and

Fig. 2 is a partial cross-section on the line II—II in Fig. 1, of a gear wheel clutch.

Fig. 3 is a longitudinal section of a fluid transmitting box.

Fig. 4 shows the clutch applied to a propeller drive.

Referring first to Figs. 1 and 2, 1 is the driving shaft carrying a gear wheel 3 which, together with the gear wheels 4, 5 mounted in the casing 6, forms a gear pump. The casing 6 is fixed on the driven shaft 2 and closely encases the wheels, leaving room only for the chambers 12 and 13 on either side of the gear wheels. From chambers 12 channels 14 and 15 lead through casing 6 and shaft 2 to the annular groove 16 of a packing box 9 mounted on shaft 2, and shown more particularly in Fig. 3, from which a conduit 17 subdivided into several branches 17′, 17″, 17‴ leads to a reservoir outside of the clutch. In the conduit 17′ is inserted a hand-operated valve 26, in the conduit 17″ an overload valve 27, in conduit 17‴ a non-return valve 28. A similar series of conduits 21, 22, 23, radial bores 25′ in the shaft 1, a circular groove 25 in the seat of the casing, and passages 24 lead from reservoir 20 across the packing box 10 into shaft 1 and from there through casing 6 to chambers 13.

The operation of this device is as follows: When shaft 1 rotates as indicated by the arrow $a$, valve 26 being open, a delivery of liquid takes place from reservoir 20 to chambers 13 through the pump to chambers 12 and back to the reservoir. During this action no turning-moment is transmitted, shaft 2 remaining stationary. If valve 26 is closed altogether shaft 2 will rotate with the same number of revolutions as shaft 1; at intermediate positions of the valve a certain slip will occur between the two parts of the clutch. The safety valve 27 opens only if the pressure in the liquid exceeds the admissible limit. The load on the overload valve can be made adjustable for instance by varying the compression of the spring by means of screw 29 so that the limit of the maximum turning-moment to be transmitted by the clutch can be adjusted at will. On reversing shaft 1 the direction of delivery of the pump is reversed also, but as the liquid can now flow off through channels 21 to 24 to reservoir 20 without encountering any resistance, no pressure is generated and therefore shaft 2 is not carried along. The same effect is obtained if shaft 2 rotates as indicated by arrow $a$ at higher speed than shaft 1, including the case where shaft 1 is at rest. If the shaft 1 is reversed or if the clutch is operated on the free-wheel principle, i. e., shafts 1 and 2 rotate in the same direction but the driven shaft 2 leads the driving shaft 1, the direction in which the gear wheels 4, 5 deliver, is reversed so that the liquid from the clutch is discharged through the passages 13, 24, the groove 25, the passages 25', 23, 22 and 21. If this condition prevails for a longer period and the throttle valve 26 is closed the gear wheels might run dry and undergo excessive wear. This is prevented by a check valve 28 in the branch conduit 17''' which remains closed under all operating conditions of the clutch but opens if the shaft 1 is reversed or led by the driven shaft 2 so that liquid from the reservoir 20 is drawn into the clutch and running dry of the gear wheels is prevented.

In the arrangement shown in Fig. 4 an engine 50 drives a propeller 52 by means of a long intermediate shaft 51. A clutch with rotating delivery members 73, 74, 75 is inserted in the fly-wheel 53 of the engine. The conduits 76, 77 leading away from the pump chambers of this clutch extend through shaft 51 to boxes 54, 55 enclosing the shaft, from which stationary pipes 56, 57, subdivided in three branches each, lead to a reservoir 60. In each pipe system are inserted throttle valves 61 and 62, overload valves 63 and 64 and suction valves 65 and 66, respectively. The provision of pairs of suction-, overload- and throttle valves enables a turning-moment transmission in both directions also with rotary pump members. The overload valves protect the clutch against overstraining, and, if exactly adjusted, they are apt to render harmless all torsional vibrations, which are known to arise with every rhythmic increase of the turning-moment, the overload valve opening and the clutch consequently slipping as soon as the normal turning-moment is exceeded. By correspondingly loading the overload valve the maximum limit of the turning-moment can be adjusted differently for each direction of rotation. The valve 61 inserted in that branch conduit which is connected to the pressure side of the pump in the main turning direction, renders it possible, by opening this valve, to disconnect the propeller from the engine. The engine can now be started alone and thereafter, by closing the valve, be coupled with the propeller. The starting, for instance on a flying machine, may, however, also take place from the propeller, the latter, in consequence of the free-wheel action of the clutch, being set rotating by the travelling wind during gliding flight, when valve 62 is open. If valve 62 is closed, the propeller, in consequence of its moment of inertia, will carry along the gearing parts of the engine, and the engine will be started. Valve 62 can now be opened again in order to render possible the free-wheel action of the clutch during normal operation, for this free-wheel action prevents all injury to the shaft 51 or propeller 52 if for any reason (for instance through seizing of piston) the engine should stop of a sudden.

I wish it to be understood that I do not desire to be limited to the exact details of construction shown and described for obvious modifications will occur to a person skilled in the art.

I claim:—

1. A hydraulic clutch comprising a driving and a driven part, a pump having two cooperating rotary parts, one of said parts being operatively connected to one, and the other being operatively connected to the other part of said clutch, one of said clutch parts defining two liquid passages connected, respectively, to the suction and delivery ends of said pump, a fixed liquid reservoir which is open to the atmosphere, fixed pipe lines extending from said reservoir to said passages, and packing means connecting said fixed pipe lines to said passages in said rotary parts, and an overload valve and a nonreturn valve arranged in parallel intermediate said reservoir and said clutch in the conduit formed by said pipe lines and said passages.

2. A hydraulic clutch comprising a driving and a driven part, a pump subdivided into two units each having a rotary part and a liquid passage in said rotary part, a fixed liquid reservoir which is open to the atmosphere, pipe lines extending from said fixed reservoir to the passages in the rotary parts of said units, packing means connecting said fixed pipe lines to said passages in said rotary parts, an overload valve and a non-return valve intermediate said reservoir and the conduit formed by said pipe line and said passages, and means for regulating the load on said overload valve.

3. A hydraulic clutch comprising a rotary driving and a rotary driven part, a pump having two cooperating parts one of said parts being operatively connected to one, and the other being operatively connected to the other part of said clutch, one of said clutch parts defining two liquid passages connected, respectively, to the suction and delivery ends of said pump, a fixed liquid reservoir which is open to the atmosphere, fixed pipe lines extending from said reservoir to said passages, packing means connecting said pipe lines to said passages, an overload valve, a non-return valve and a throttle valve connected in parallel to one of said pipe lines, and means for varying the free sectional area of said throttle valve.

4. A hydraulic clutch comprising a driving and a driven part, a pump having two cooperating rotary parts, one of said parts being operatively connected to one, and the other being operatively connected to the other part of said clutch, one of said clutch parts defining two liquid passages connected, respectively, to the suction and delivery ends of said pump, a fixed liquid reservoir which is open to the atmosphere, fixed pipe lines extending from said reservoir to said passages, and packing means connecting said fixed pipe lines to said passages in said rotary parts, and an overhead valve and a non-return valve arranged in parallel in one of said pipe lines.

5. A hydraulic clutch comprising a rotary driving and a rotary driven part, a pump having two cooperating parts one of said parts being operatively connected to one, and the other being operatively connected to the other part of said clutch, one of said clutch parts defining two liquid passages connected, respectively, to the suction and delivery ends of said pump, a fixed liquid reservoir which is open to the atmosphere, fixed pipe lines extending from said reservoir to said passages, packing means connecting said pipe lines to said passages, and overload valve, a non-return valve and a throttle valve in one of said pipe lines.

6. A hydraulic clutch comprising a rotary driving and a rotary driven part, a pump having two cooperating parts one of said parts being operatively connected to one, and the other being operatively connected to the other part of said clutch, one of said clutch parts defining two liquid passages connected, respectively, to the suction and delivery ends of said pump, a fixed liquid reservoir which is open to the atmosphere, fixed pipe lines extending from said reservoir to said passages, packing means connecting said pipe lines to said passages, and throttling means and non-return valves opening from said reservoir to said clutch connected in parallel to each of said pipe lines.

In testimony whereof I affix my signature.

JOHANNES GASTERSTÄDT.